US008537743B2

(12) United States Patent
Barave et al.

(10) Patent No.: US 8,537,743 B2
(45) Date of Patent: Sep. 17, 2013

(54) PRIORITY-BASED MULTIMEDIA STREAM TRANSMISSIONS

(75) Inventors: Amit Prakash Barave, Sunnyvale, CA (US); Shmuel Shaffer, Palo Alto, CA (US); Steven L. Christenson, Campbell, CA (US); Marcelo Oliveira, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1022 days.

(21) Appl. No.: 12/049,108

(22) Filed: Mar. 14, 2008

(65) Prior Publication Data
US 2009/0232114 A1    Sep. 17, 2009

(51) Int. Cl.
*H04W 4/00* (2009.01)

(52) U.S. Cl.
USPC .................. 370/328; 370/230.1; 370/392

(58) Field of Classification Search
USPC .............. 370/230, 230.1, 231, 235, 328–329, 370/338, 341, 352–356, 389, 392, 442–445, 370/447, 462
See application file for complete search history.

(56) References Cited

U.S. PATENT DOCUMENTS

| | | | | |
|---|---|---|---|---|
| 6,147,977 A * | 11/2000 | Thro et al. | ...................... | 370/265 |
| 6,188,698 B1 * | 2/2001 | Galand et al. | .................. | 370/412 |
| 6,816,500 B1 * | 11/2004 | Mannette et al. | ............. | 370/431 |
| 7,558,247 B2 * | 7/2009 | Lee et al. | ........................ | 370/351 |
| 7,596,096 B2 * | 9/2009 | Crawford et al. | ............. | 370/248 |
| 7,602,722 B2 * | 10/2009 | Chheda | .......................... | 370/236 |
| 7,768,978 B2 * | 8/2010 | Numakura et al. | ............ | 370/333 |
| 7,796,532 B2 * | 9/2010 | Connor et al. | ................. | 370/252 |
| 7,860,087 B2 * | 12/2010 | Kim | ................................ | 370/389 |
| 7,899,444 B2 * | 3/2011 | Hans et al. | ....................... | 455/416 |
| 8,065,712 B1 * | 11/2011 | Cheng et al. | ........................ | 726/1 |
| 8,189,460 B2 * | 5/2012 | Shaffer et al. | .................. | 370/229 |
| 2002/0196785 A1 * | 12/2002 | Connor | .......................... | 370/392 |
| 2004/0058698 A1 * | 3/2004 | Crockett et al. | .............. | 455/518 |
| 2004/0109424 A1 * | 6/2004 | Chheda | .......................... | 370/331 |
| 2004/0213152 A1 * | 10/2004 | Matuoka et al. | ............... | 370/230 |
| 2005/0243733 A1 * | 11/2005 | Crawford et al. | ............. | 370/252 |
| 2007/0058559 A1 * | 3/2007 | Xu | ................................ | 370/252 |
| 2007/0206592 A1 * | 9/2007 | Itakura et al. | .................. | 370/389 |
| 2007/0263818 A1 * | 11/2007 | Sumioka et al. | .......... | 379/201.01 |
| 2008/0008183 A1 * | 1/2008 | Takagaki et al. | .............. | 370/392 |
| 2008/0092223 A1 * | 4/2008 | Setia et al. | ....................... | 726/11 |
| 2008/0114600 A1 * | 5/2008 | Shaffer et al. | .................. | 704/270 |
| 2009/0182655 A1 * | 7/2009 | Wang et al. | ...................... | 705/34 |
| 2009/0219937 A1 * | 9/2009 | Liu et al. | ......................... | 370/392 |
| 2009/0285220 A1 * | 11/2009 | Shaffer et al. | ............. | 370/395.42 |
| 2010/0011434 A1 * | 1/2010 | Kay | ................................ | 726/14 |

\* cited by examiner

*Primary Examiner* — Kevin Mew
(74) *Attorney, Agent, or Firm* — Schwegman, Lundberg & Woessner, P.A.

(57) ABSTRACT

A method is provided that accesses a priority and a multimedia stream to be transmitted. The priority then is embedded within the multimedia stream. The multimedia stream thereafter is transmitted. Another method is provided that receives the multimedia stream that includes the priority. Here, another priority is accessed and both priorities are compared. The control of multimedia stream transmissions to other communication devices is based on this comparison.

20 Claims, 9 Drawing Sheets

PRIORITY-BASED MULTIMEDIA STREAM TRANSMISSIONS

FIELD

The present disclosure relates generally to communication systems. In an example embodiment, the disclosure relates to priority-based multimedia stream transmissions.

BACKGROUND

In general, a communication system is a collection of communications networks, transmission systems, relay stations, tributary stations, and data terminal equipment usually capable of interconnection and interoperation to form an integrated whole. Communication devices may communicate with each other within the communication system. In a communication system, any number of communication devices can communicate concurrently. Since all the communication devices are allowed to communicate (e.g., transmit audio traffic), the transmissions may overload or flood the communication system, thereby, for example, cause transmission delays or render audio transmissions to be unintelligible.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to one skilled in the art that embodiments of the inventive subject matter may be practiced without these specific details. In general, well-known instruction instances, protocols, structures and techniques have not been shown in detail.

Overview

A method is provided that accesses a priority and a multimedia stream to be transmitted. The priority then is embedded within the multimedia stream. The multimedia stream thereafter is transmitted. Another method is provided that receives the multimedia stream that includes the priority. Here, another priority is accessed and both priorities are compared. The control of multimedia stream transmissions to other communication devices is based on this comparison.

EXAMPLE EMBODIMENTS

Figure 1:
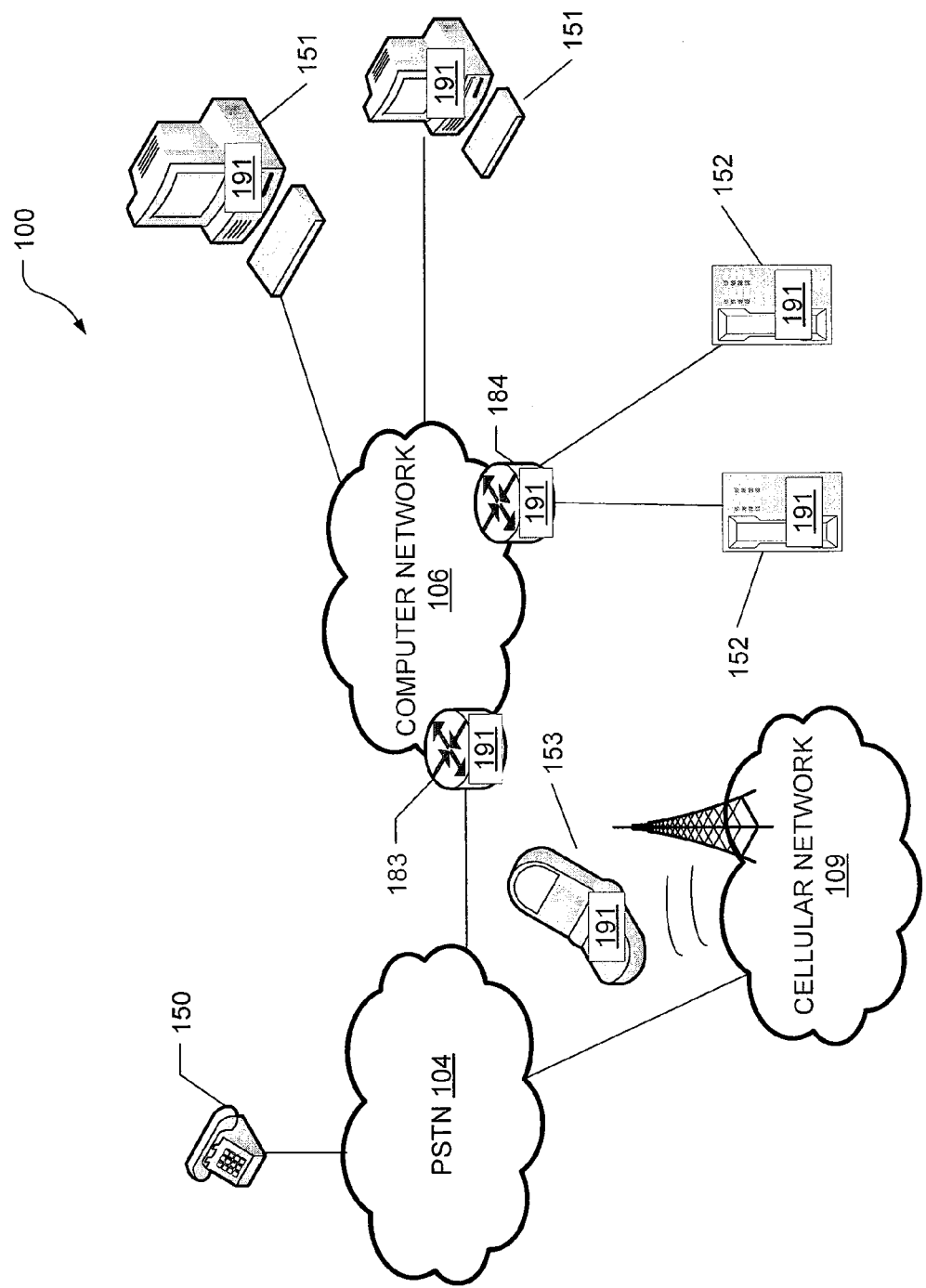
FIG. 1 depicts a simplified diagram of communication system, in accordance with an example embodiment.

FIG. 1 depicts a simplified diagram of communication system 100, in accordance with an example embodiment. Communication system 100 includes public switched telephone network (PSTN) 104, cellular network 109, and various networked computing devices, such as communication devices 150-153, in communication by way of computer network 106. In general, computer network 106 is a collection of interconnected computing devices, such as communication devices 150-153, that communicate utilizing wired or wireless mediums. Examples of computer networks, such as computer network 106, include Local Area Networks (LANs) and/or Wide Area Networks (WANs), such as the Internet. A communication device is a piece of equipment used in communication and is associated with or attached to a communication network. Examples of communication devices include telephones 150, computers 151, Voice over Internet Protocol (VoIP) phones 152, mobile phones 153, gateways 183, routers 184, switches, transmission systems, relay systems, and other communication devices.

In communication with computer network 106 is PSTN 104, which can also be referred to as a Plain Old Telephone System (POTS). PSTN 104 is a collection of interconnected systems operated by telephone companies. The PSTN 104 may, for example, include telephones 150, switches, and other systems and elements. The PSTN 104 may communicate with computer network 106 by way of gateway 183. The gateway 183 provides voice interoperability between computer and non-computer networks, such as PSTN 104, by bridging telephone transmissions to Internet Protocol (IP) multicast streams.

In communication with computer network 106 by way of PSTN 104 is cellular network 109. Cellular network 109 is a type of radio network with a full duplex system. Examples of cellular network 109 include code division multiple access (CDMA), time division multiple access (TDMA), and other cellular networks. Mobile phones 153, for example, may be included in cellular network 109.

As illustrated in FIG. 1, communication devices 151, 152, 153, 183, and 184 may host multimedia stream manager module 191. As explained in more detail below, multimedia stream manager module 191 may be configured to embed a priority in a multimedia stream before the multimedia stream is transmitted over computer network 106. A priority is one or more values that identify a precedence associated with the multimedia stream. The priority may identify a right of a multimedia stream to precede other multimedia streams in order, rank, or privilege. The priority can be assigned based on a variety of attributes. In an example, a priority may be assigned to a user account. Here, a user account is a computer record associated with the user. A high priority may be assigned to one account while a lower priority may be assigned to another account. In another example, a priority may be assigned to a role associated with the user account. The roles may correspond to, for example, military ranks, corporate hierarchies/governance, government grade levels, and other roles. In military rankings, a high priority may be assigned to the role of a general while a low priority may be assigned to the role of a private. In still another example, a priority may be assigned to a particular communication device, such as a push-to-talk radio. As explained in more detail below, multimedia stream manager module 191 may control multimedia stream transmissions to other communication devices based on the priority.

Figure 2:
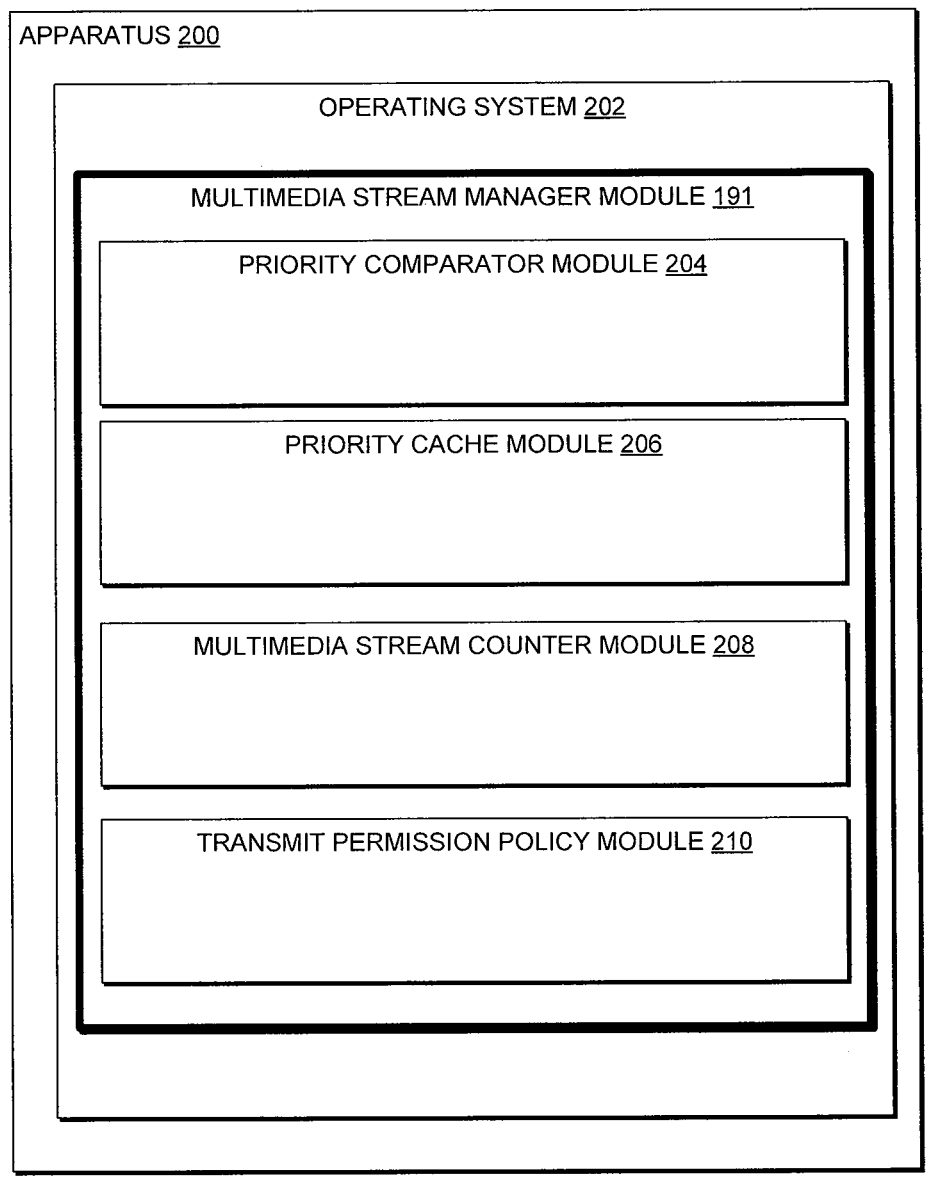
FIG. 2 depicts a simplified block diagram of modules, in accordance with an example embodiment, included in apparatus.

FIG. 2 depicts a simplified block diagram of modules 191, 204, 206, 208, and 210, in accordance with an example embodiment, included in apparatus 200. Apparatus 200 includes operating system 202 (e.g., Cisco's Internetworking Operating System) that manages the software processes and/or services executing on the apparatus. As shown in FIG. 2, these software processes and/or services may include multimedia stream manager module 191. In turn, multimedia stream manager module 191 includes priority comparator module 204, priority cache module 206, multimedia stream counter module 208, and transmit permission policy module 210. It should be appreciated that apparatus 200 may be deployed in the form of a variety of communication devices. For example, apparatus 200 may form a part of one of the communication devices depicted in FIG. 1, such as computer 151, VoIP phone 152 or gateways 183 and 184. In various example embodiments, apparatus 200 may be used to implement computer programs, logic, applications, methods, processes, or other software to embed priorities in multimedia streams and to control multimedia stream transmissions based on the priorities, as described in more detail below.

In an example embodiment, the priority comparator module 204 is configured to embed priorities into multimedia streams, which is explained in more detail below. In another example embodiment, priority comparator module 204 is configured to compare various priorities. The priorities can be stored in priority cache 206, where the priorities may be retrieved for later use by, for example, priority comparator module 204 for comparisons.

Multimedia stream counter module 208 is configured to count the number of active multimedia streams. As explained in more detail below, the count may be used to trigger the comparison of the priorities. With the comparisons, the transmit permission policy module 210 may be configured to control multimedia stream transmissions to other communication devices based on the comparison. As explained in more detail below, the transmit permission policy module 210 may either allow or block transmissions of multimedia streams from apparatus 200 to other communication devices.

It should be appreciated that in other example embodiments, multimedia stream manager module 191 may include fewer or more modules apart from those shown in FIG. 2. For example, priority comparator module 204 may be separated into two modules, one module configured to embed priorities and the other module to compare priorities. Alternatively, in another example, multimedia stream counter module 208 may be excluded from multimedia stream manager module 191 and be implemented as a separate module altogether.

Figure 3:
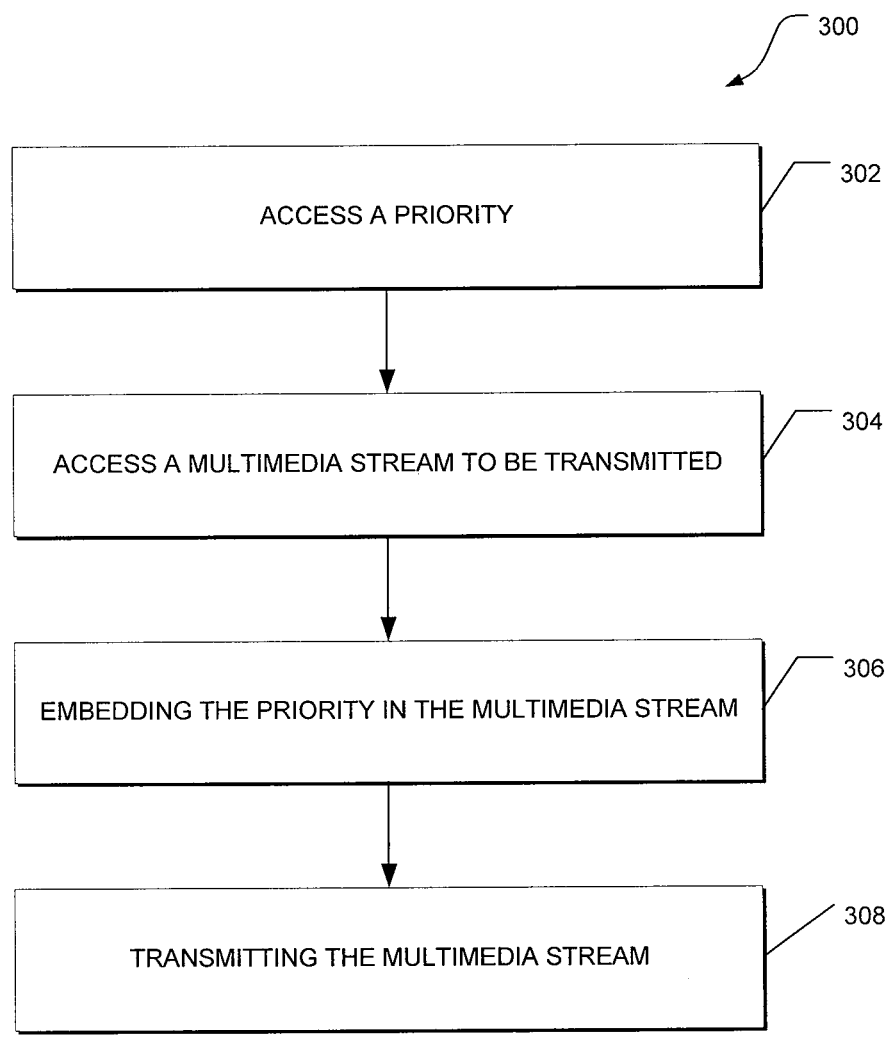
FIG. 3 depicts a flow diagram of a general overview of a method, in accordance with an example embodiment, for embedding a priority in a multimedia stream.

FIG. 3 depicts a flow diagram of a general overview of a method, in accordance with an example embodiment, for embedding a priority in a multimedia stream. In an example embodiment, method 300 may be implemented by multimedia stream manager module 191 shown in FIG. 2 and employed in apparatus 200. As shown in FIG. 3, one or more priorities are accessed at 302. The priority accessed may be a pre-defined priority that is stored in a communication device, such as a push-to-talk radio that is configured to operate in half-duplex mode. In an example, as discussed above, a particular priority may be assigned to a user account. Here, multiple user accounts may exist and a pre-defined priority is assigned to each user account. A user may log on to his user account on the computing device and, with the login, the pre-defined priority assigned to the user account is accessed.

In addition, one or more multimedia streams are accessed at 304. This multimedia stream accessed is destined to be transmitted to other communication devices. In general, the multimedia stream is data (or flow of data) associated with audio and/or video. An example of a multimedia stream is digitized audio data transmitted between VoIP phones. Another example of a multimedia stream is data transmitted between computers in a video conference, where the data includes both digitized audio and video images. In still another example, a multimedia stream is audio data transmitted between push-to-talk radios.

At 306, the priority is embedded within the multimedia stream. For example, the priority can be inserted into the multimedia stream. The multimedia stream may be encapsulated in a variety of protocols. In an example, the multimedia stream is encapsulated in real-time transport protocol (RTP). In general, RTP defines a standardized packet format for delivering audio and video over the Internet. The priority may be embedded within an RTP packet and, in an example embodiment, embedded within a header of the RTP packet. An RTP header is generally twelve bytes in size and may include information such as version identifier, timestamp, synchronization source identifier, extension header, and other information. In another example, the multimedia stream is encapsulated in RTP control protocol (RTCP). In general, RTCP defines out-of-band control information for RTP streams. In another example embodiment, the priority may be embedded within an RTCP packet. In yet another example embodiment, the priority may be embedded within a control signal used to establish a communication session.

After the priority is embedded in the multimedia stream, the multimedia stream is transmitted at 308 to another communication device. As explained in more detail below, this communication device that receives the multimedia stream may then control its multimedia stream transmissions based on the priority extracted from the received multimedia stream.

Figure 4:
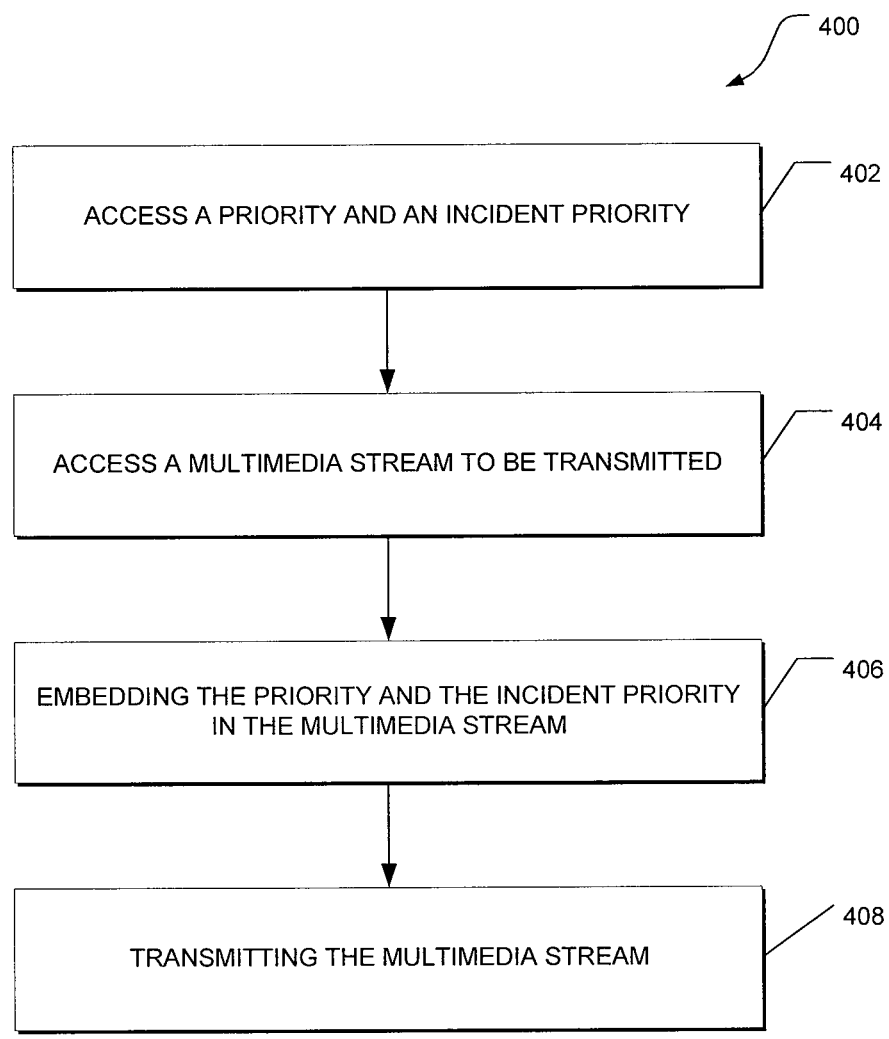
FIG. 4 depicts a flow diagram of a general overview of a method, in accordance with an example embodiment, for additionally embedding an incident priority in a multimedia stream.

FIG. 4 depicts a flow diagram of a general overview of a method, in accordance with an example embodiment, for additionally embedding an incident priority in a multimedia stream. In an example embodiment, method 400 may be implemented by multimedia stream manager module 191 shown in FIG. 2 and employed in apparatus 200. As shown in FIG. 4, one or more priorities are accessed at 402. In addition, one or more incident priorities are accessed at 402. An incident priority is a priority assigned to one or more incidents that may override other non-incident priorities. An incident is an event or an occurrence. An incident can include an emergency event, for example, a fire at a particular address, a hurricane covering multiple cities, an earthquake located at a geographic location, and other emergency events. The incident priority may include one or more values that identify a priority assigned to one or more incidents. For example, an earthquake may be assigned a high incident priority while a burglary incident can be assigned a low incident priority. It should be appreciated that a user may assign an incident priority to a multimedia stream transmission when using the communication device. Alternatively, as explained in more detail below, the incident priority may be automatically assigned based on end-user credentials or communication channels that are used for transmitting the multimedia stream.

At 404, one or more multimedia streams are accessed and, at 406, both the priority and the incident priority are embedded into the multimedia streams. Alternatively, only the incident priority is embedded into the multimedia stream. The multimedia stream is then transmitted to another communication device. As explained in more detail below, this communication device that receives the multimedia stream may then control its multimedia stream transmissions based on the priority and incident priority extracted from the received multimedia stream.

Figure 5:
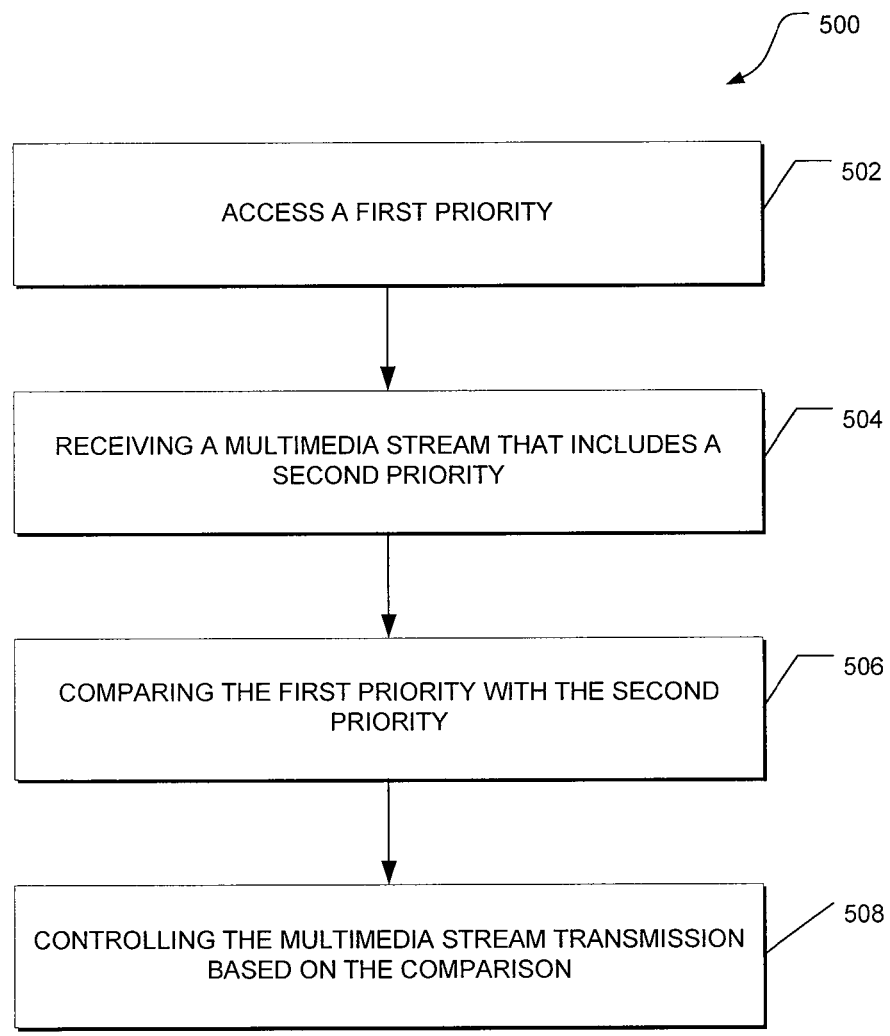
FIG. 5 depicts a flow diagram of a general overview of a method, in accordance with an example embodiment, controlling the multimedia stream transmissions based on priorities.

FIG. 5 depicts a flow diagram of a general overview of a method, in accordance with an example embodiment, controlling the multimedia stream transmissions based on priorities. In an example embodiment, method 500 may be implemented by multimedia stream manager module 191 shown in FIG. 2 and employed in apparatus 200. It should be noted that although method 500 may be implemented by the same multimedia stream manager module 191 discussed in FIGS. 3 and 4, the multimedia stream manager module that implements method 500 is hosted on a communication device that is separate from the communication device that implements methods 300 and 400 referred to in FIGS. 3 and 4, respectively.

As shown in FIG. 5, a communication device, for example, may access one or more priorities (or "first priority") 502. The first priority accessed may be a pre-defined priority that is stored in the communication device. In an example, as discussed above, a particular priority may be assigned to a user account and this particular priority may be accessed at login.

At 504, the communication device then receives a multimedia stream that includes another priority (or "second priority"). It should be noted that this multimedia stream (or received multimedia stream) originated from another communication device. As discussed above, the second priority may be embedded within the multimedia stream. This second priority may, for example, be a different priority associated with a different user account. The second priority is extracted from the multimedia stream and, at 506, the first priority is compared with the second priority. The comparison is made to determine the ranking of the first priority relative to the second priority. Depending on the type of ranking used, the first priority may have a higher or a lower ranking (or priority) than the second priority. For example, a first priority with a "1" value can be ranked higher than a second priority with a "5" value. Alternatively, the first priority with a "1" value can be ranked lower than the second priority with a "5" value. In another example, a first priority with an "A" value may be ranked higher than a second priority with a "C" value. Alternatively, the first priority with the "A" value may be ranked lower than the second priority with the "C" value.

After the first priority is compared with the second priority, the communication device at 508 may control the multimedia stream transmission based on the comparison. For example, as explained in more detail below, the communication device may block transmissions of its multimedia streams to other communication devices if the first priority is lower than the second priority. On the other hand, if the first priority is greater than the second priority, then communication device may allow transmissions of its multimedia streams to other communication devices.

Figure 6A:
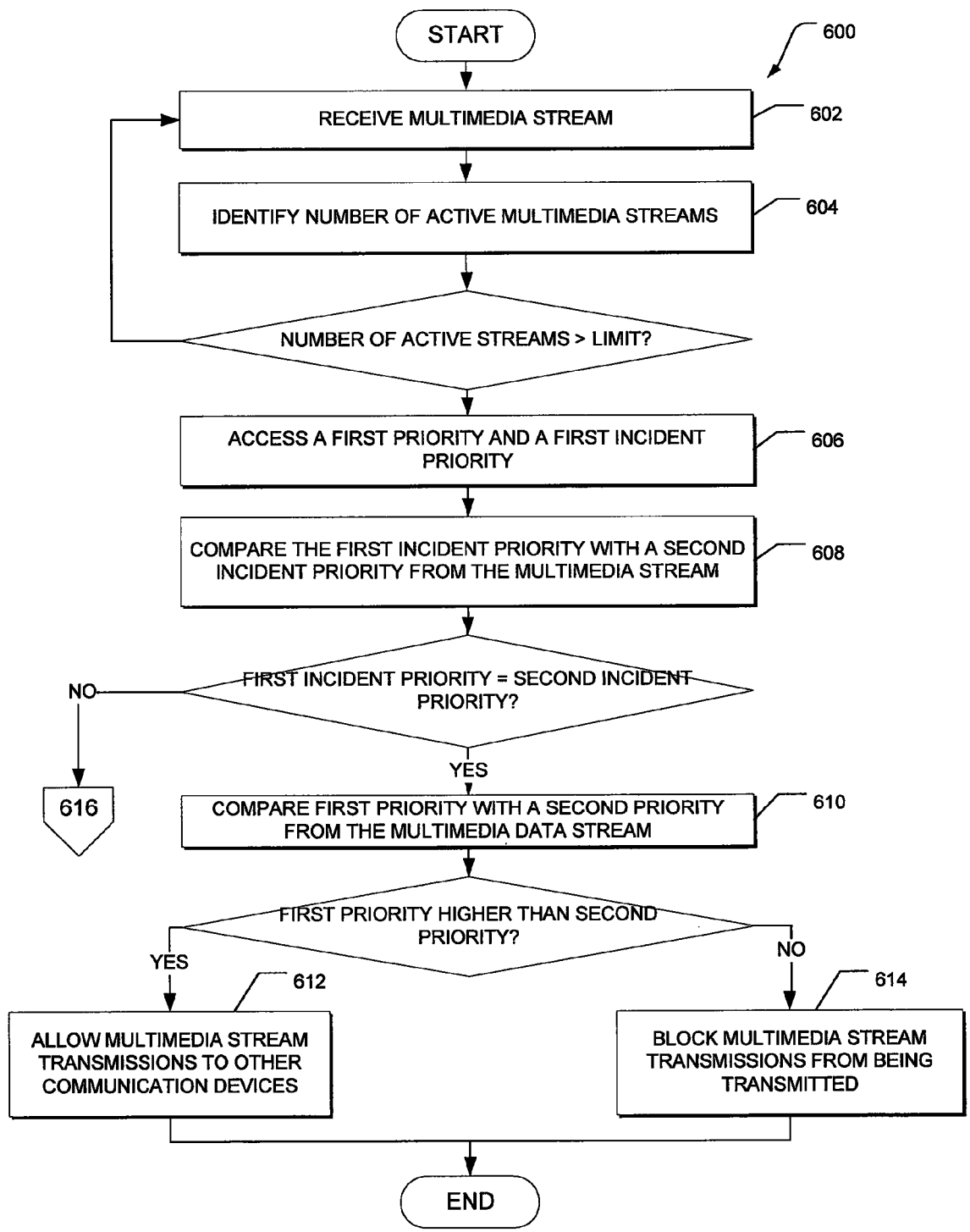
FIGS. 6a and 6b depict a flow diagram of detailed operations, in accordance with an example embodiment, for controlling the multimedia stream transmissions based on priorities.
Figure 6B:
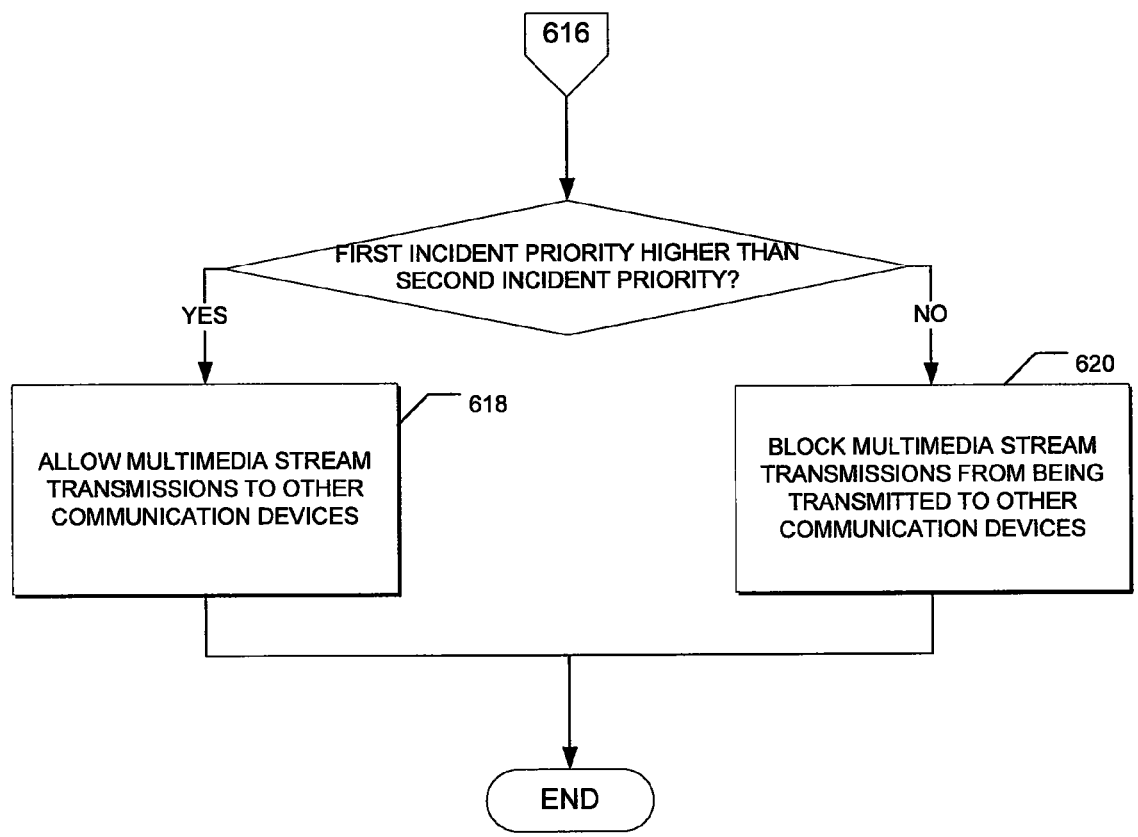

FIGS. 6*a* and 6*b* depict a flow diagram of detailed operations, in accordance with an example embodiment, for controlling the multimedia stream transmissions based on priorities. In an example embodiment, method 600 may be implemented by multimedia stream manager module 191 shown in FIG. 2 and employed in apparatus 200. It should be noted that although method 600 may be implemented by the same multimedia stream manager module 191 discussed in FIGS. 3 and 4, the multimedia stream manager module that implements method 600 is hosted on a communication device that is separate from the communication device that implements methods 300 and 400 referred to in FIGS. 3 and 4, respectively.

As shown in FIG. 6*a*, a communication device receives a multimedia stream at 602. This multimedia stream originated from another communication device, and a priority (or "second priority") and an incident priority (or "second incident priority) are embedded within this multimedia stream.

To avoid flooding a computer network with multimedia streams, a communication device may be configured to limit its transmissions based on a number of incoming (or received) multimedia streams within a given communication session. For example, the communication device may block further transmissions of multimedia streams to other communication devices if the communication device identifies (or detects), for example, three or more incoming multimedia streams in a talk group. The limit of three incoming multimedia streams is an example, and it should be appreciated that, depending on the computer network capacity, the limit may include any number of incoming multimedia streams.

At 604, a number of active multimedia streams are identified. The identification may be made by counting the number of received multimedia streams, which may be made by a multimedia stream counter module. If the number of active multimedia streams is less than a pre-defined limit, such as three, then the communication device may be allowed to continue to receive multimedia streams.

On the other hand, if the number of active multimedia streams exceeds the limit, then another priority (or "first priority) and another incident priority (or "first incident priority) are accessed from the communication device at 606. It should be noted that the first priority and first incident priority are not from multimedia streams received from other communication devices. Rather, the first priority and the first incident priority originate from the communication device itself. The first priority, for example, may be assigned to a user account, and this first priority may be accessible when the user logs on the user account. The first incident priority, for example, may be assigned by a user of the communication device, such as an incident commander or another third party.

Still referring to FIG. 6*a*, the first incident priority is compared with the second incident priority from the received multimedia stream at 608. If the first incident priority is equal to or equivalent to the second incident priority, then another comparison of the first priority and the second priority is made at 610. This other comparison is made because when the incident priorities are equivalent, then the control of the multimedia stream transmissions is based on the priorities and not the incident priorities. For example, the first incident priority may be equal to the second incident priority because both incident priorities relate to the same incident, such as an earthquake located at a particular location. As such, the communication device is configured to control multimedia stream transmissions based on the priorities instead of the first and second incident priorities. As an example, the control of the multimedia stream transmissions may be based on the ranking of rescue workers that are associated with the earthquake incident.

The control of the multimedia stream transmissions is based on the comparison at 610. For example, if the comparison reveals that the first priority associated with the communication device is higher than the second priority from the received multimedia stream, then the communication device at 612 allows multimedia steam transmissions to other communication devices. Otherwise, if the comparison revels that the first priority associated with the communication device is lower than the second priority from the received multimedia stream, then the communication device at 614 blocks further multimedia stream transmissions from itself to other communication devices.

As shown in FIG. 6b, beginning at 616, if the first incident priority associated with the communication device is higher than the second incident priority from the received multimedia stream, then the communication device at 618 is configured to allow multimedia steam transmissions to other communication devices. This may occur for example, when the first incident priority associated with an incident, such as an earthquake, has priority over another incident, such as a burglary, associated with the second incident priority. Here, the incident priorities may override other priorities. Accordingly, the priorities can be ignored.

Returning to 616, if the first incident priority associated with the communication device is lower than the second incident priority from the received multimedia stream, then the communication device at 620 is configured to block multimedia steam transmissions to other communication devices. As a result, with each individual communication device in communication system configured to block its multimedia stream transmissions to other communication devices, the number of multimedia stream transmissions between communication devices may be reduced, thereby preventing the flooding of a computer network.

Furthermore, it should be noted that a variety of events may trigger the control of multimedia stream transmissions based on priority comparisons and/or the incident priority comparisons. In an example, multimedia stream transmissions can be controlled when multiple multimedia streams compete for limited network resources, such as limited network bandwidth. Here, for example, the control of multimedia stream transmissions may be invoked to free network resources such that important multimedia stream transmissions can be made.

Figure 7:
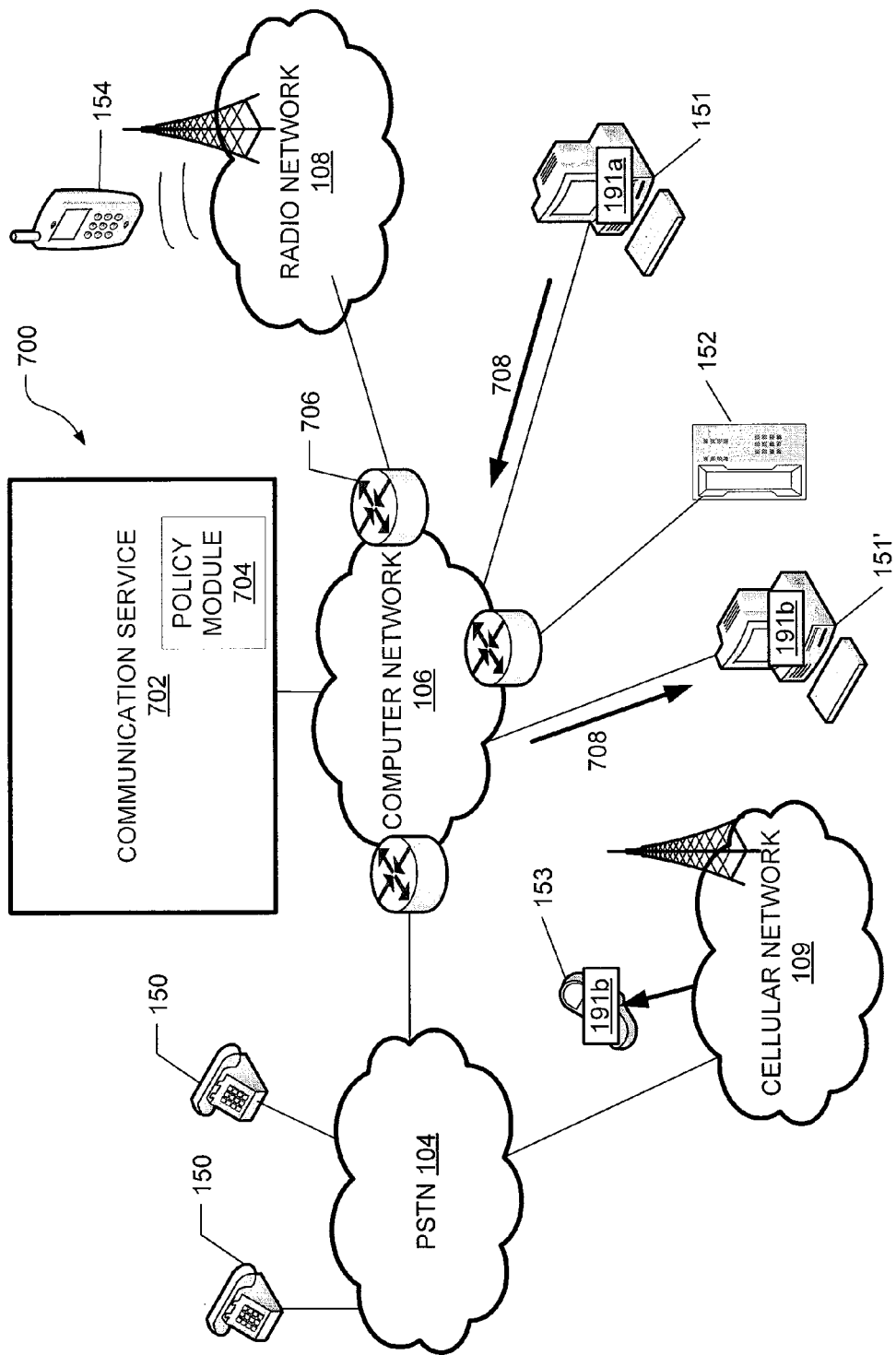
FIG. 7 depicts example operations, in accordance with an example embodiment, for embedding priorities and controlling multimedia stream transmissions based on the priorities in an example communication system.

FIG. 7 depicts example operations, in accordance with an example embodiment, for embedding priorities and controlling multimedia stream transmissions based on the priorities in an example communication system 700. Communication system 700 includes communication service 702 in communication with PSTN 104, cellular network 109, radio network 108, and various communication devices 150-154 (e.g., computers, push-to-talk radios, mobile phones, and other communication devices) by way of computer network 106. The communication service 702 can include a variety of software applications and/or hardware that can monitor and intercept communications between communication devices 150-154 within communication system 700. The communication service can be hosted on one or more server computers and, as explained in more detail below, may be configured to regulate unauthorized multimedia stream transmissions. An example of communication service 702 is an interoperability and collaboration system, which facilitates communication interoperability amongst different communication paradigms. A communication paradigm (or a communication modality) is a mode of communication amongst a collection of interrelated communication devices. The communication paradigm can be distinguished by data format, type of signal, physical link or infrastructure or other communication characteristics. For example, the interoperability and collaboration system may facilitate communication between push-to-talk radios 154 (e.g., ultra high frequency (UHF) radio, very high frequency (VHF), and other push-to-talk radios) of radio network 108 and telephony endpoints (e.g., communication devices 150 and other endpoints) of PSTN 104. In another example, the interoperability and collaboration system can facilitate communication between push-to-talk radios 154 of radio network 108 and VoIP endpoints, such as VoIP phone 152 or software client residing on computer 151, by controlling the media and signaling of radio and VoIP systems, resulting in a direct communication of the push-to-talk radios with the VoIP phone.

It should be appreciated that radio network 108 is a collection of communication devices that communicate over radio waves, such as UHF and very high frequency (VHF). The radio network 108 includes, for example, a land-mobile-radio (LMR) network. Examples of communication devices included in radio network 108 include push-to-talk radio 154 (e.g., UHF radios, VHF radios, and other radio network-based communication devices). It should be noted that push-to-talk radio 154 or other communication devices included in radio network 108 are push-to-talk radios that operate in half duplex mode, which is in contrast to phones 150 that operate in full duplex mode. The radio network 108 may communicate with computer network 106 by way of gateway 706, which provides voice and control interoperability between the radio network and the computer network by bridging media and control transmissions to Internet Protocol (IP) multicast and/or Unicast (e.g., Session Initiation Protocol (SIP)) streams. Although not shown, it should be appreciated that gateway 706 includes a multimedia stream manager module. This multimedia stream manager module marks the IP media stream from push-to-talk radio 154 with the appropriate priority to ensure that the push-to-talk radio adhere to the policies governing the transmission into a specific talk group, as described above.

In the example shown in FIG. 7, a multimedia stream manager 191a is hosted on computer 151. Another multimedia stream manager 191b is hosted on computer 151'. Before computer 151 transmits multimedia stream 708 to another communication device, such as computer 151', push-to-talk radio 154, phones 150, or VoIP phone 152, the computer 151 (or multimedia stream manager 191a) embeds a priority into the multimedia stream. Here, the priority may be assigned to a particular user account and the priority can be made accessible once the user account is activated. For example, a user may log on to computer 151 using a particular user account. A priority is assigned to this particular user account. Once the user logs into the user account, all further multimedia stream transmissions from computer 151 are embedded with the assigned priority.

Computer 151' thereafter receives multimedia stream 708 from computer 151. To make a comparison of priorities, computer 151' (or multimedia stream manager 191b) reads the embedded priority from multimedia stream 708. In addition, computer 151' accesses its own priority and compares the priorities. If the priority embedded within multimedia stream 708 is greater then its priority, then computer 151' may block further multimedia stream transmissions from itself to other communication devices 150-154. On the other hand, if the priority embedded within multimedia stream 708 is lower than its priority, then computer 151' may continue to allow multimedia stream transmissions from itself to other communication devices 150-154. It should be noted a similar evaluation is continuously made by other multimedia stream manager modules hosted on communication devices. As a result, multimedia stream manager module 191a may detect that the incoming multimedia stream from computer 151' has a higher priority and stop the transmission of multimedia stream 708, thereby yielding computer network 106 to the higher priority incoming multimedia stream from computer 151'.

In an example embodiment, communication system 700 may include a mechanism to regulate unauthorized multimedia stream transmissions. For example, a communication device, such as computer 151', may ignore the priorities and not block any multimedia stream transmissions from itself to other communication devices, such as computer 151, VoIP phone 152, and radio 154. If enough communication devices 150-154 ignore the priorities, then the applicable talk groups or computer network 106 may be flooded. Communication service 702 may include policy module 704 to regulate unauthorized multimedia stream transmissions. For example, computer 151 may receive an unauthorized multimedia stream from computer 151'. Computer 151 can identify that multimedia stream from computer 151' is not authorized. For example, the computer 151 may identify that the priority of the computer is higher than priority embedded within the multimedia stream from computer 151'. Since multimedia stream from computer 151 has a higher priority than multimedia stream from computer 151', computer 151 should not be receiving additional transmissions from computer 151'.

Here, for example, computer 151 may identify that the unauthorized multimedia stream was transmitted from computer 151'. The multimedia stream is unauthorized because, as discussed above, the priority of computer 151 has a higher priority than multimedia stream from computer 151'. It should be appreciated that each multimedia stream includes an identifier (e.g., port number) that identifies the communication device, such as computer 151', that originated the multimedia stream. If enough unauthorized multimedia streams from computer 151' are received, then computer 151 may report computer 151' to communication service 702. For example, if three multimedia streams of equal priority are already transmitted over a talk group, then computer 151' should not contribute a fourth multimedia stream into the talk group. Here, computer 151 may report computer 151' by transmitting an identifier of the computer 151' to communication service 702.

After the report (or complaint) by computer 151, policy module 704 within communication service 702 may track the number of reports from other communication devices that identify computer 151' as transmitting unauthorized multimedia streams. If communication service 702 receives a large number of complaints about computer 151', then the communication service may block further multimedia stream transmissions from the computer. To block multimedia stream transmissions, communication service 702 may, for example, intercept multimedia streams transmitted from computer 151' and not forward the multimedia streams to other communication devices 150-152 and 154. Alternatively, communication service 702 may notify all the trusted communication devices (endpoints against which there were no reports of unauthorized multimedia stream transmissions) about a new multicast address for communication. This new multicast address is not forwarded to the communication devices, such as computer 151', that made the unauthorized stream transmissions. As a result, the communication device that made the unauthorized multimedia stream transmissions is prevented from participating in the communication event.

Figure 8:
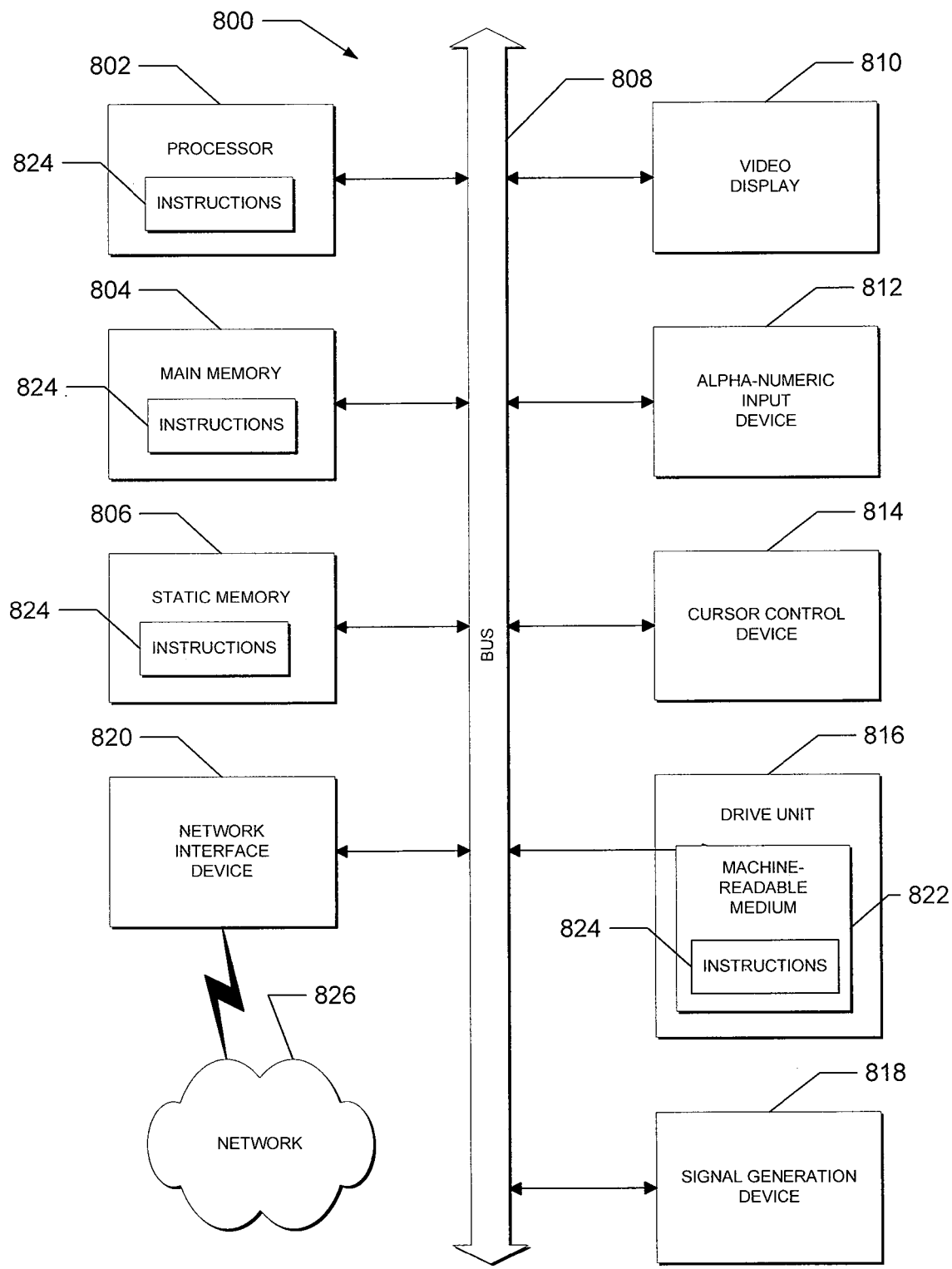
FIG. 8 is a simplified block diagram of a machine in the example form of a computing system within which a set of instructions, for causing the machine to perform any one or more of the methodologies discussed herein, may be executed.

FIG. 8 is a simplified block diagram of a machine in the example form of a computing system within which a set of instructions, for causing the machine to perform any one or more of the methodologies discussed herein, may be executed. In alternative embodiments, the machine may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computing system 800 includes processor 802 (e.g., a central processing unit (CPU), a graphics processing unit (GPU) or both), main memory 804 and static memory 806, which communicate with each other via bus 808. Computing system 800 may further include video display unit 810 (e.g., a plasma display, a liquid crystal display (LCD) or a cathode ray tube (CRT)). Computing system 800 also includes alphanumeric input device 812 (e.g., a keyboard), user interface (UI) navigation device 814 (e.g., a mouse), disk drive unit 816, signal generation device 818 (e.g., a speaker) and network interface device 820.

Disk drive unit 816 includes machine-readable medium 822 on which is stored one or more sets of instructions and data structures (e.g., software 824) embodying or utilized by any one or more of the methodologies or functions described herein. Software 824 may also reside, completely or at least partially, within main memory 804 and/or within processor 802 during execution thereof by computing system 800, with main memory 804 and processor 802 also constituting machine-readable, tangible media. Software 824 may further be transmitted or received over network 826 via network interface device 820 utilizing any one of a number of well-known transfer protocols (e.g., Hypertext Transfer Protocol (HTTP)).

While machine-readable medium 822 is shown in an example embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

While the invention(s) is (are) described with reference to various implementations and exploitations, it will be understood that these embodiments are illustrative and that the scope of the invention(s) is not limited to them. In general, techniques for embedding priorities in multimedia streams may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A system comprising:
a first communication device configured to:
embed a first priority assigned to the first communication device in a real-time transport control protocol (RTCP) packet, the RTCP packet being associated with a multimedia stream destined to a second communication device; and
transmit the multimedia stream and the RTCP packet to the second communication device; and
the second communication device in communication with the first communication device, the second communication device configured to:
receive the multimedia stream and the RTCP packet with the embedded first priority;
access from the second communication device a second priority assigned to the second communication device;
compare the first priority with the second priority; and
control a multimedia stream transmission from the second communication device to a third communication device based on the comparison.

2. The system of claim 1, wherein the second communication device is configured to control the multimedia stream transmission by transmitting another multimedia stream to the third communication device when the second priority is higher than the first priority.

3. The system of claim 1, wherein the second communication device is configured to control the multimedia stream transmission by blocking another multimedia stream from being transmitted to the third communication device when the second priority is lower than the first priority.

4. The system of claim 1, further comprising a communication service in communication with the first and second communication devices, the multimedia stream being transmitted from the first communication device to the second communication device by way of the communication service, wherein the second communication device is further configured to:
identify that the multimedia stream was transmitted from the first communication device when the second priority is higher than the first priority;
report the first communication device that transmitted the multimedia stream to the communication service, the communication service being configured to further block further multimedia transmission from the first communication device.

5. A method comprising:
accessing a multimedia stream to be transmitted to a communication device;
embedding a priority assigned to a second communication device in a real-time transport control protocol (RTCP) packet, the RTCP packet being associated with the multimedia stream; and
transmitting the multimedia stream and the RTCP packet to the communication device.

6. The method of claim 5, further comprising:
accessing an incident priority assigned to an incident; and
embedding the incident priority in the RTCP packet associated with the multimedia stream.

7. A method comprising:
accessing a first priority assigned to a first communication device;
receiving a multimedia stream and a real-time transport control protocol(RTCP) packet associated with the multimedia stream from a second communication device, wherein a second priority assigned to the second communication device is embedded in the RTCP packet;
comparing the first priority with the second priority; and
controlling a multimedia stream transmission to a third communication device based on the comparing of the first priority with the second priority.

8. The method of claim 7, wherein the controlling of the multimedia stream transmission includes transmitting another multimedia stream to the third communication device when the first priority is higher than the second priority.

9. The method of claim 7, wherein the controlling of the multimedia stream transmission includes blocking another multimedia stream from being transmitted to the third communication device when the first priority is lower than the second priority.

10. The method of claim 7, wherein the RTC packet associated with the multimedia stream further includes a first incident priority that is associated with a first incident, the method further comprising:
accessing a second incident priority that is associated with a second incident;
comparing the first incident priority with the second incident priority; and
controlling the multimedia stream transmission to the third communication device based on the comparing of the first incident priority and the second incident priority.

11. The method of claim 7, the method further comprising:
identifying that the multimedia stream was transmitted from the second communication device when the first priority is higher than the second priority; and
report the second communication device to a communication service, the communication service to block further multimedia transmission from the second communication device.

12. An apparatus, comprising:
at least one processor; and
a memory in communication with the at least one processor, the memory being configured to store a multimedia stream manager module executable by the at least one processor, and the multimedia stream manager module executed by the at least one processor to cause operations to be performed, comprising:
accessing a multimedia stream and a real-time transport control protocol (RTCP) packet associated with the multimedia stream to be transmitted;
embedding a priority assigned to a first communication device in the RTCP packet, the RTCP packet being associated with the multimedia stream; and
transmitting the multimedia stream and the RTCP packet.

13. The apparatus of claim 12, wherein the multimedia stream includes audio data.

14. The apparatus of claim 12, wherein the operations further comprise:
accessing an incident priority assigned to an incident; and
embedding the incident priority in the RTCP packet associated with the multimedia stream.

15. An apparatus, comprising:
at least one processor; and a memory in communication with the at least one processor, the memory being configured to store a multimedia stream manager module executable by the at least one processor, and the multimedia stream manager module executed by the at least one processor to cause operations to be performed, comprising:

accessing a first priority assigned to a first communication device;

receiving a multimedia stream and a real-time transport control protocol (RTCP) packet associated with the multimedia stream from a second communication device, wherein a second priority assigned to the second communication device is embedded in the RTCP packet;

comparing the first priority with the second priority; and controlling a multimedia stream transmission to a third communication device based on the comparing of the first priority with the second priority.

16. The apparatus of claim 15, wherein the operation of controlling the multimedia stream transmission is performed at least in part by transmitting another multimedia stream from the apparatus to the third communication device when the first priority is higher than the second priority.

17. The apparatus of claim 15, wherein the operation of controlling the multimedia stream transmission is performed at least in part by blocking another multimedia stream from being transmitted from the apparatus to the third communication device when the first priority is lower than the second priority.

18. The apparatus of claim 15, wherein the RTCP packet associated with the multimedia stream further includes a first incident priority that is associated with a first incident, wherein the operations further comprise:

accessing a second incident priority that is associated with a second incident;

comparing the first incident priority with the second incident priority; and controlling the multimedia stream transmission to the third communication device based on the comparing of the first incident priority and the second incident priority.

19. The apparatus of claim 15, wherein the operations further comprise:

identifying that the multimedia stream was transmitted from the second communication device when the first priority is higher than the second priority; and reporting the second communication device to a communication service, the communication service being configured to block further multimedia transmission from the second communication device.

20. The method of claim 5, further comprising:

embedding the priority in a communication session control signal associated with the second communication device.

\* \* \* \* \*